US 7,095,583 B2

(12) United States Patent
Johnson et al.

(10) Patent No.: US 7,095,583 B2
(45) Date of Patent: Aug. 22, 2006

(54) DUAL MODE SERVO PATTERN

(75) Inventors: Douglas W. Johnson, Stillwater, MN (US); Denis J. Langlois, River Falls, WI (US); Richard W. Molstad, St. Paul, MN (US); Yung Yip, Afton, MN (US)

(73) Assignee: Imation Corp., Oakdale, MN (US)

( * ) Notice: Subject to any disclaimer, the term of this patent is extended or adjusted under 35 U.S.C. 154(b) by 294 days.

(21) Appl. No.: 10/859,376

(22) Filed: Jun. 2, 2004

(65) Prior Publication Data

US 2006/0126207 A1 Jun. 15, 2006

(51) Int. Cl.
*G11B 5/584* (2006.01)
(52) U.S. Cl. .................. 360/77.12; 360/78.02
(58) Field of Classification Search ............ None
See application file for complete search history.

(56) References Cited

U.S. PATENT DOCUMENTS

| 5,689,384 | A | 11/1997 | Albrecht et al. |
|---|---|---|---|
| 5,898,533 | A | 4/1999 | Mantey et al. |
| 6,021,013 | A | 2/2000 | Albrecht et al. |
| 6,023,385 | A | 2/2000 | Gillingham et al. |
| 6,134,070 | A | 10/2000 | Tran et al. |
| 6,241,674 | B1 | 6/2001 | Phillips et al. |
| 6,271,786 | B1 | 8/2001 | Huff et al. |
| 6,312,384 | B1 | 11/2001 | Chiao |
| 6,363,107 | B1 | 3/2002 | Scott |
| 6,381,261 | B1 | 4/2002 | Nagazumi |
| 6,385,268 | B1 | 5/2002 | Fleming et al. |
| 6,400,754 | B1 | 6/2002 | Fleming et al. |
| 6,462,904 | B1 | 10/2002 | Albrecht et al. |
| 2001/0053174 | A1 | 12/2001 | Fleming et al. |
| 2002/0093640 | A1 | 7/2002 | Watanabe et al. |
| 2005/0099713 | A1* | 5/2005 | Molstad et al. ............ 360/48 |
| 2005/0099715 | A1* | 5/2005 | Yip et al. ................... 360/48 |
| 2005/0254163 | A1* | 11/2005 | Nakao ................... 360/77.12 |

OTHER PUBLICATIONS

"Pulse Compression Recording," Dent III et al., *IEEE Transaction on Magnetics*, vol. MAG-12, No. 6, Nov. 1976, pp. 743-745.
"Amplitude-Based Servo Patterns for Magnetic Media," Molstad et al., U.S. Appl. No. 10/464,394, filed Jun. 17, 2003.
"Multi-Band Servo Patterns with Inherent Track ID," Molstad et al., U.S. Appl. No. 10/704,958, filed Nov. 10, 2003.
"Servo Patterns with Inherent Track ID," Yip et al., U.S. Appl. No. 10/704,959, filed Nov. 10, 2003.
"Servo Writing Devices for Creating Servo Patterns with Inherent Track ID," Yip et al., U.S. Appl. No. 10/705,041, filed Nov. 10, 2003.

* cited by examiner

*Primary Examiner*—K Wong
*Assistant Examiner*—Mitchell Slavitt
(74) *Attorney, Agent, or Firm*—Eric D. Levinson

(57) ABSTRACT

A servo pattern is described that facilitates high resolution and wide dynamic range to accurately pinpoint servo track centerlines on a magnetic tape. The servo pattern provides both absolute positioning information over an entire servo band and absolute positioning information relative to the centerline of each servo track included in the servo band. Therefore, the servo pattern includes implicit servo track identification in a single servo band, eliminating the need for conventional track identification marks. In other words, the servo pattern, itself, can distinguish one servo track from another servo track in the single servo band as well as provide highly accurate positioning information relative to each of the servo track centerlines.

24 Claims, 12 Drawing Sheets

# DUAL MODE SERVO PATTERN

TECHNICAL FIELD

The invention relates to magnetic storage media and, more particularly, magnetic tape media recorded with amplitude-based servo patterns.

BACKGROUND

Data storage media are commonly used for storage and retrieval of data, and come in many forms, such as magnetic tape, magnetic disks, optical tape, optical disks, holographic disks or cards, and the like. Magnetic tape media remains economical for storing large amounts of data. For example, magnetic tape cartridges, or large spools of magnetic tape, are often used to back up data in large computing centers. Magnetic tape cartridges also find application in the backup of data stored on smaller computers such as desktop or notebook computers.

In magnetic media, data is typically stored as magnetic signals that are magnetically recorded on the medium surface. The data stored on the medium is typically organized along "data tracks," and transducer heads are positioned relative to the data tracks to write data to the tracks or read data from the tracks. A typical magnetic storage medium, such as magnetic tape, typically includes several data tracks in a data band. Optical media, holographic media, and other media formats can also make use of data tracks.

Servo patterns refer to signals or other recorded marks on the medium that are used for tracking purposes. In other words, servo patterns are recorded on the medium to provide reference points relative to the data tracks. A servo controller interprets detected servo patterns and generates position error signals. The position error signals are used to adjust the lateral distance of the transducer head relative to the data tracks so that the transducer head is properly positioned along the data tracks for effective reading and/or writing of the data to the data tracks.

With some data storage media, such as magnetic tape, the servo patterns are stored in specialized tracks on the medium, called "servo tracks." Servo tracks serve as references for the servo controller. Servo tracks typically hold no data except for information that is useful to the servo controller to identify positioning of a transducer head relative to the surface of the medium. A plurality of servo tracks may be defined in a servo band. Some magnetic media include a plurality of servo bands, with data tracks being located between the servo bands.

The servo patterns recorded in the servo tracks may be sensed by one or more servo heads. For example, servo heads may be dedicated heads that read only servo patterns in the servo tracks. Alternatively, servo heads may be integrated with a read/write head. In any case, once a particular servo track is located by the servo head, one or more data tracks can be located on the medium according to the data track's known displacement from the servo track. The servo controller receives detected servo signals from the servo heads, and generates position error signals, which are used to adjust positioning of a read/write head relative to the data tracks.

Servo patterns are referred to as pre-recorded when they are recorded during the fabrication of the media. In other words, pre-recorded servo patterns are servo patterns recorded in the media prior to the media being used for storage of data. These pre-recorded servo patterns allow the media to achieve higher storage densities because the servo patterns enable positions on the media to be located with greater precision. Therefore, servo patterns allow for smaller amounts of media surface to be used to store units of data.

Amplitude-based servo patterns refer to servo patterns in which detection of the servo signal amplitude enables identification of head positioning relative to the medium. Amplitude-based servo patterns typically make use of amplitude-based servo windows which can be recorded or erased windows where a signal has been recorded or erased from the medium. As the head passes relative to the medium, signal amplitudes of detected servo signals can be used to determine whether the head is positioned correctly relative to a track on the medium. Amplitude-based servo patterns are commonly implemented in magnetic tape media, but may also be useful in other media.

SUMMARY

In general, the invention is directed to a servo pattern that facilitates high resolution and wide dynamic range to accurately pinpoint servo track centerlines on a magnetic tape. The servo pattern provides both absolute positioning information over an entire servo band and absolute positioning information relative to the centerline of each servo track included in the servo band. The servo pattern also includes implicit servo track identification in a single servo band, eliminating the need for conventional track identification marks. In other words, the servo pattern itself can distinguish one servo track from another servo track in the single servo band as well as provide highly accurate positioning information relative to each of the servo track centerlines.

In one embodiment, the invention is directed to a magnetic tape comprising a servo frame. The servo frame includes a set of track servo windows positioned to define a set of parallel centerlines. The servo frame also includes a first cross-band servo mark and a second cross-band servo mark. The first cross-band servo mark is non-parallel to the centerlines and the second cross-band servo mark is non-parallel to both the centerlines and the first cross-band servo mark. The first and second cross-band servo marks may cross one or more of the centerlines defined by the set of track servo windows. The servo frame may also include a second set of track servo windows to define the set of centerlines and a third cross-band servo mark. The third cross-band servo mark is non-parallel to the centerlines and parallel to the first cross-band servo mark. The third cross-band servo mark may also cross one or more of the centerlines.

In another embodiment, the invention is directed to a magnetic head positioned proximate a magnetic tape, the magnetic head comprising a first module and a second module. The first module includes at least one write gap to record a servo carrier signal across a servo band of the magnetic tape. The second module includes a set of staggered erase gaps, a first cross-band erase gap, and a second cross-band erase gap. The set of staggered erase gaps erase areas of the servo carrier signal to create a set of track servo windows positioned to define a set of parallel centerlines in the servo band. The first cross-band erase gap erases areas of the servo carrier signal to create a first cross-band servo mark, which may be positioned before the set of track servo windows. The first cross-band servo mark is non-parallel to the centerlines. The second cross-band erase gap erases areas of the servo carrier signal to create a second cross-band servo mark, which may be positioned after the set of track servo windows. The second cross-band servo mark is non-parallel to both the centerlines and the first cross-band servo mark.

In another embodiment, the invention is directed to a method comprising recording a set of track servo windows positioned to define a set of parallel centerlines in a servo band of a magnetic tape. The method also comprises recording a first cross-band servo mark and recording a second cross-band servo mark. The first cross-band servo mark is recorded to be non-parallel to the centerlines and the second cross-band servo mark is recorded to be non-parallel to both the centerlines and the first cross-band servo mark.

Various aspects of the invention can provide a number of advantages. For example, the described servo pattern facilitates both high resolution and wide range for pinpointing locations on magnetic tape. The set of track servo windows facilitates absolute positioning information relative to the centerlines defined by the set of track servo windows. The first and second cross-band servo marks, which may be positioned before and after the set of track servo windows, respectively, can facilitate absolute positioning information over the entire servo band. In other words, the invention is capable of defining a specific servo track within the servo band and a specific location of the servo track centerline without conventional track identification marks. In addition, the invention directly supports a dual stage servo actuator commonly used in modern magnetic tape storage devices. For example, in some embodiments of the invention, the set of track servo windows encodes fine positioning information and the first and second cross-band servo marks encode coarse positioning information.

The coarse positioning information encoded by the first and second cross-band servo marks may also be used to facilitate track identification of the different servo tracks defined by the set of track servo windows. Therefore, the servo pattern can eliminate the need for conventional track identification marks. The first and second cross-band servo marks may be analogous to conventional time-based servo marks and the set of track servo windows may be analogous to conventional amplitude-based servo marks. The inclusion of both the set of track servo windows and the first and second cross-band servo marks can yield additional advantages for magnetic tape relative to media that does not include both the set of track servo windows and the first and second cross-band servo marks.

The details of one or more embodiments of the invention are set forth in the accompanying drawings and the description below. Other features, objects, and advantages of the invention will be apparent from the description and drawings and from the claims.

DETAILED DESCRIPTION

Figure 1:
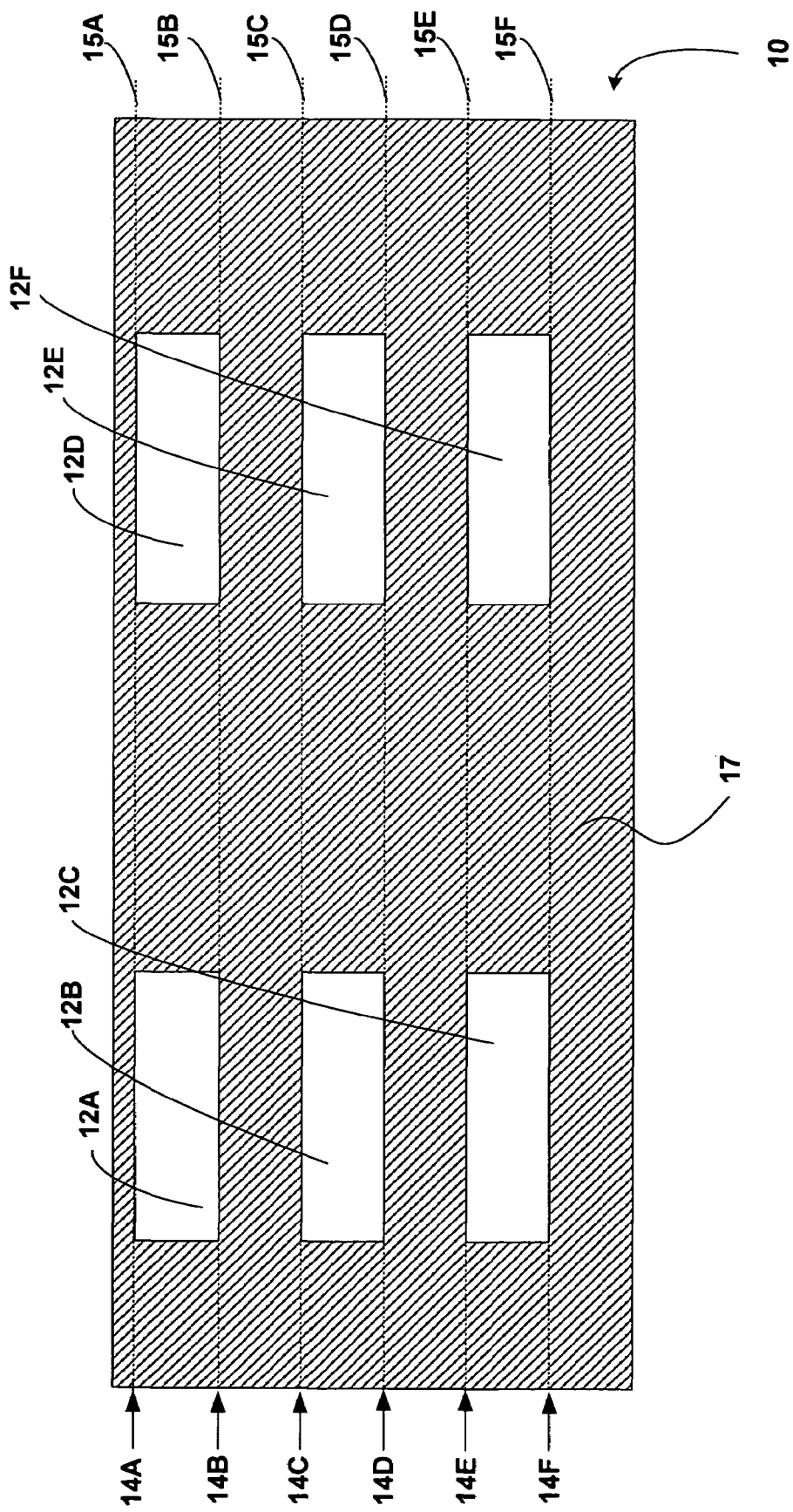
FIG. 1 is a depiction of a servo band portion of a prior art magnetic tape recorded with a conventional amplitude-based servo pattern.

FIG. 1 is a depiction of a servo band portion of a prior art magnetic tape 10 recorded with a conventional amplitude-based servo pattern. The conventional servo pattern illustrated in FIG. 1 includes a number of servo windows 12A–12F. Servo windows 12 may comprise areas where a previously recorded magnetic signal 17 has been erased from magnetic tape 10. Magnetic tape 10 includes a number of servo tracks 14A–14F that define centerlines 15A–15F. As a head moves over magnetic tape 10 relative to one of servo tracks 14, the strength of the magnetic signal detected by the head can identify the location of the head relative to a given one of centerlines 15.

For example, as a servo head moves partially over servo window 12A along centerline 15B, the detected signal amplitude should reduce by 50 percent if the head is precisely on-track. The detected signal is 100 percent when the head is not passing over a servo window, but reduces when the head passes partially over a servo window because the part of the head passing over the servo window is not exposed to a signal. If the detected signal amplitude falls by an amount greater or less than 50 percent as the head passes partially over servo window 12A along centerline 15B, then the head can be moved to better position the head over centerline 15B. In this manner, centerlines 15 of servo tracks 14 can be located. Corresponding data tracks (not shown) are located at defined displacements from centerlines 15 of servo tracks 14.

Figure 2:
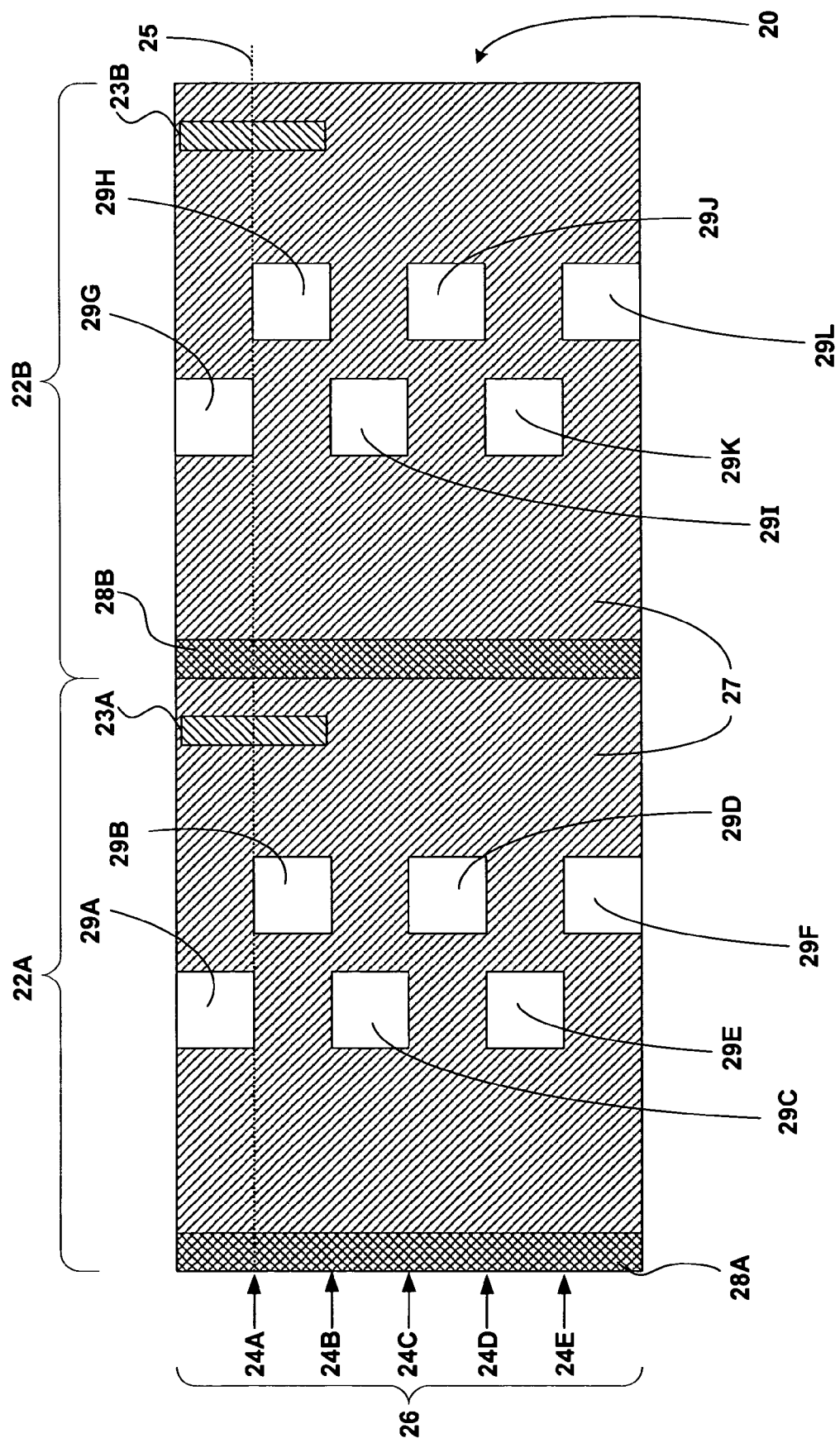
FIG. 2 is another depiction of a servo band portion of a prior art magnetic tape recorded with a conventional amplitude-based servo pattern.

FIG. 2 is another depiction of a servo band portion of a prior art magnetic tape 20 recorded with a conventional amplitude-based servo pattern. The conventional servo pattern in FIG. 2 includes two servo frames 22A and 22B. Each frame includes five servo tracks 24A, 24B, 24C, 24D and 24E. These five servo tracks 24 collectively define a servo band 26. In general, a servo band is defined as a collection of a plurality of servo tracks. Thus, a servo band could include any number of servo tracks. Each of servo tracks 24 may reside a known distance from a corresponding data track or set of data tracks (not shown).

The servo pattern can be written by passing the magnetic tape under gaps of a servo write head. A relatively wide gap in the servo head can be used to record a magnetic signal 27 having a first frequency on the surface of magnetic tape 20. Moreover, a magnetic signal having a second frequency may define transition regions 28A and 28B between the individual frames. To record transition regions 28A and 28B, the frequency of the written signal is changed for a short period of time while the tape passes under the wide gap in the servo head. The transition regions 28 serve as synchronization marks in the prior art servo detection scheme.

A servo write head (or a separate erase head) having a relatively small write gap track width in the direction transverse to the servo track direction can be used to create erased servo windows 29. For example, erased servo windows 29A–29L (collectively erased servo windows 29) may form a checkerboard-like configuration that enables a read head to pinpoint track locations. In accordance with the prior art, the erased servo windows 29 respectively positioned above and below centerline 25 have a common width.

In operation, as magnetic tape 20 passes by a read head (not shown) positioned over a first track (indicated by numeral 24A), the position of erased servo windows 29A and 29B or 29G and 29H relative to magnetic servo carrier signal 27, can accurately define the track location of the head. Similarly, the track locations of tracks 2–5 (indicated by numerals 24B–24E respectively) can be defined by the various erased servo windows 29 relative to magnetic pattern 27. Detection of transition regions 28 provides a synchronization mechanism so that when signal amplitude indicates head positioning that is off-track, the servo controller can determine whether to cause movement of the magnetic head laterally up or down in order to remedy the off-track head positioning. With common sized servo windows 29, the head controller could become out of sync if transition regions 28 or another type of synchronization mechanism is not recorded on magnetic tape 20 between servo frames 22. Transition regions 28 typically cross one or more centerlines 25.

Magnetic tape 20 also includes track identification marks 23A, 23B. Track identification marks 23 allow a servo controller to distinguish track 24A from tracks 24C and 24E. Without track identification marks 23 on magnetic tape 20, the detected signals associated with tracks 24A, 24C and 24E are generally indistinguishable. For this reason, magnetic tape 20 includes track identification marks 23 to distinguish track 24A from tracks 24C and 24E. For example, track identification marks 23 may comprise a magnetic signal having a different discernable frequency than signal 17. Track identification marks 23 are conventionally shaped different from servo windows 29. Also, unlike servo windows 29, track identification marks 23 are not positioned or used for amplitude-based servo positioning. For example, track identification marks 23 typically cross one or more centerline 25. Adjacent servo bands may include track identification marks similar to marks 23, but positioned differently within the given band, so that tracks 24C, 24D and 24E can be identified. The discussion of FIG. 3 provides additional details of prior art use of conventional track identification marks.

Figure 3:
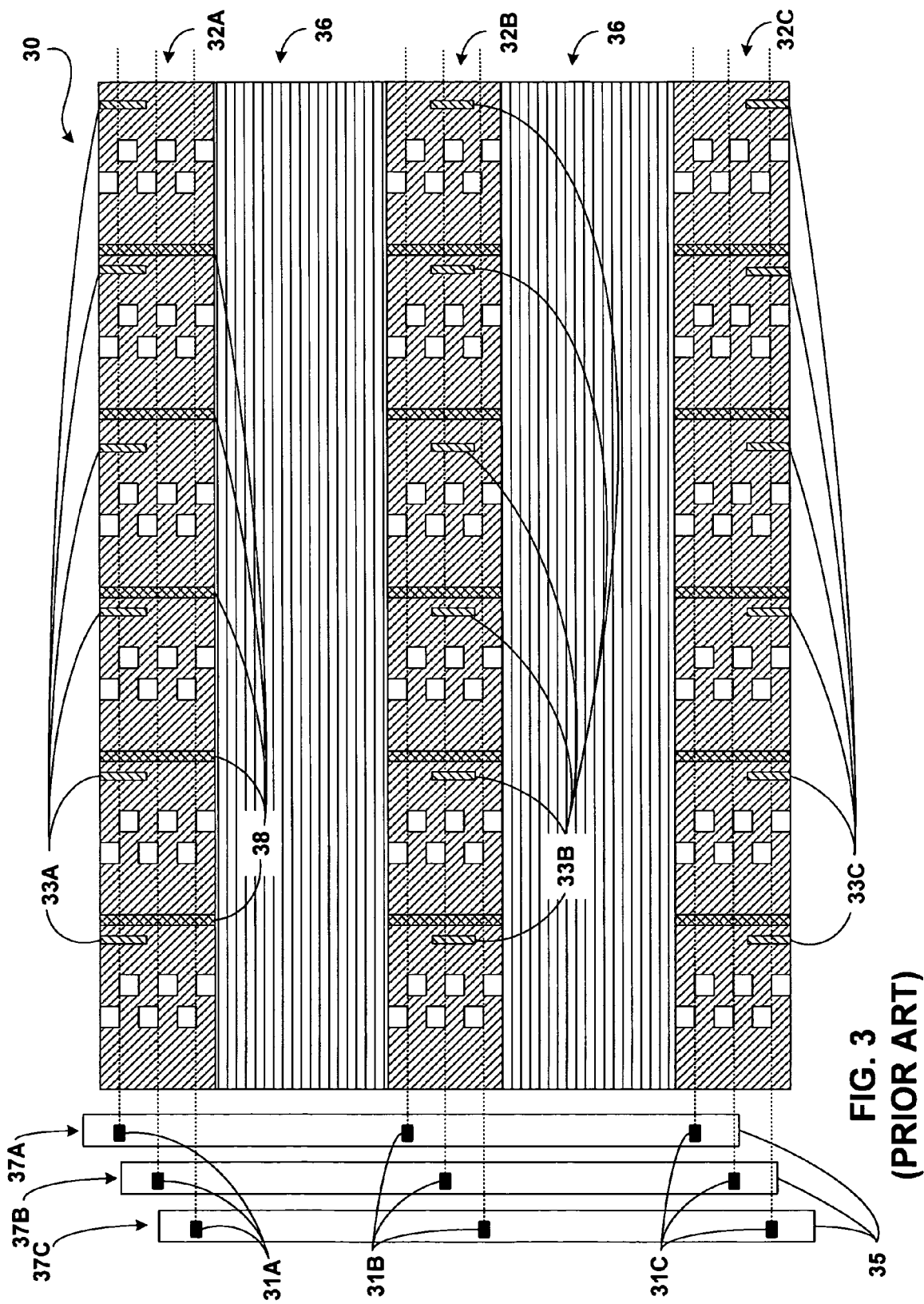
FIG. 3 is a depiction of a prior art magnetic tape recorded with conventional amplitude-based servo patterns.

FIG. 3 is a prior art depiction of magnetic tape 30 relative to a servo read device 35 including three magnetic heads 31A, 31B, 31C. In particular, servo read device 35 is illustrated in three exemplary locations relative to magnetic tape 30. Magnetic tape 30 includes servo bands 32A, 32B and 32C. Data tracks 36 are positioned relative to servo bands 32. Each servo band 32 defines a plurality of servo tracks. Each servo band 32 includes synchronization marks 38 (only synchronization marks 38 of servo band 32A are labeled in FIG. 3 although every servo band 32 includes similar synchronization marks). Moreover, each servo band 32 includes track identification marks 33A–33C. Track identification marks 33A are located to cross the centerline of a first track of servo band 32A. However, track identification marks 33B are located to cross the centerline of a third track of servo band 32B, and track identification marks 33C are located to cross the centerline of a fifth track of servo band 32C.

Servo device 35 including servo heads 31A, 31B and 31C is illustrated in three different locations relative to magnetic tape 30, i.e., locations 37A, 37B and 37C. In particular, servo heads 31A, 31B and 31C are illustrated along centerlines associated with a first track, a third track, and a fifth track of servo bands 32. When servo heads 31 are positioned along the centerline of the first track of servo bands 32 (as shown at 37A) or the second track, servo head 31A detects track identification marks 33A. When servo heads 31 are positioned along the centerline of the third track (as shown at 37B) or the fourth track, servo head 31B detects track identification marks 33B. When servo heads 31 are positioned along the centerline of the fifth track of servo bands 32 (as shown at 37C) or the fourth track, servo head 31C detects track identification marks 33C. In general, track identification marks 33 of different servo bands 32 are positioned to cross different centerlines. Accordingly, identification marks 33 can be detected by the different servo heads 31 of servo device 35 to distinguish the tracks of servo bands 32.

The creation of conventional synchronization marks and track identification marks such as track identification marks 33A, 33B and 33C, however, can be difficult. Conventional synchronization marks and track identification marks are typically created by recording magnetic signals at different frequencies than other signals recorded in servo bands 32. Modulating the frequency during magnetic recording is difficult, particularly when precise positioning of the servo synchronization marks or track identification marks is needed. In general, creating conventional synchronization marks and track identification marks adds complexity and cost to the fabrication of magnetic media. In addition, it can be difficult or impossible to create pure transitions from one frequency to another without creating artifacts which include components of both the first and second signals. Therefore, the conventional techniques of using signal transitions to define synchronization marks or track identification have limited usefulness particularly when track densities increase.

The invention is directed to a servo pattern that provides absolute positioning information over an entire servo band as well as absolute positioning information relative to a centerline of each servo track in the servo band without the need for conventional track identification marks. In addition, the servo pattern may eliminate the need for conventional synchronization marks. In accordance with the invention, the servo pattern itself can distinguish one servo track from another servo track in the servo band as well as provide highly accurate positioning information relative to each of the servo track centerlines.

A servo frame can include cross-band servo marks before and after a set of amplitude-based track servo windows that define the centerlines of the tracks. Alternatively, the cross-band servo marks and the set of amplitude-based track servo windows may be arranged in a different order within the servo frame. In any case, the cross-band servo marks can provide inherent track identification information and possibly inherent synchronization information with respect to the amplitude-based track servo windows. In accordance with the invention, the cross-band servo marks include a first mark non-parallel to the centerlines and a second mark non-parallel to both the centerlines and the first mark. Both the first cross-band servo mark and the second cross-band servo mark may cross one or more of the centerlines to provide track identification in the servo band based on a distance between the non-parallel first and second cross-band servo marks. The set of track servo windows provide positioning information that is very precise with respect to any given track. The set of track servo windows may encode fine positioning information and the cross-band servo marks may encode coarse positioning information. In the description that follows, a specific arrangement of a servo frame is primarily described in which the cross-band servo marks are positioned before and after the set of track servo windows, which may provide an advantage of symmetry. The invention is not necessary limited to such a symmetrical arrangement, however, as the cross-band servo marks and set of track servo windows may be positioned anywhere with respect to each other, in various embodiments.

Unlike conventional track identification marks and conventional synchronization marks, the cross-band servo marks do not generally complicate media fabrication. The first and second cross-band servo marks comprise areas erased from a signal previously recorded on the magnetic tape, substantially similar to the amplitude-based servo windows. In that way, a single servo write head may write the entire servo pattern. In an added embodiment, the invention may comprise cross-band servo marks erased from a signal previously recorded on the magnetic tape, even without the set of track servo marks. Such markings would be analogous to conventional time-based servo marks, but allow for improved signal detection capabilities and improved signal-to-noise performance relative to conventional time based marks which are typically recorded signals rather than erased marks from a recorded carrier.

In other embodiments, the servo frame includes a second set of the amplitude-based track servo windows that define the centerlines of the servo tracks and a third cross-band servo mark non-parallel to the centerlines and parallel to the first servo window. The second set of track servo windows, which may be positioned after the second cross-band servo mark, may allow for a reduction in static errors in locating the centerlines. The first and second sets of track servo windows may be analogous to conventional checkerboard-like amplitude-based servo pattern configurations, but the interspersed cross-band servo marks provide improvements over such conventional patterns. The third cross-band servo mark, which may be positioned after the second set of track servo windows, may cross one or more of the centerlines. Adding the third cross-band servo mark parallel to the first cross-band servo mark may allow compensation for media defects and velocity error during the frame writing processes due to a constant, known distance between the first and third cross-band servo marks. Furthermore, the second set of track servo windows and the third cross-band servo mark may provide the servo pattern with directional symmetry that enables writing and reading in both forward and reverse directions. As mentioned above, however, the servo frame could be arranged in other symmetrical or in non-symmetrical fashions.

In general, a servo controller can always determine what servo track is being read. In particular, the controller can know how a position error signal will behave on the track that it is seeking, e.g., whether upward motion of the head causes greater or lesser signal during the time the head is near a given servo window. In other words, the polarity of the position error signal can be defined and known by the controller for any given track number. If an open loop servo system positions the head in the vicinity of the proper track, i.e., within one track pitch, when the loop is closed, the servo controller will cause the head to fall toward the desired and proper window edge.

Put another way, when the servo controller knows the expected behavior of a given track, the opposing edge of track servo windows (corresponding to adjacent tracks) is not a stable closed loop position. Having two servo windows per track (one window on either side of track centerline) complicates track interpretation by the controller. If the windows are the same size and uniformly spaced (as a checkerboard), all the tracks look the same to the controller. Another element must therefore be added to provide the required differentiation and synchronization. This is provided in some conventional media as a frequency shift in the un-windowed portion of the servo band. One aspect of this invention, however, provides this needed synchronization by adding two or more non-parallel cross-band servo marks that may cross one or more of the centerlines. The cross-band servo marks may be positioned before and after the set of amplitude-based track servo windows to provide for symmetry, although the various windows and marks could be arranged in a non-symmetric fashion as well. The cross-band servo marks can be viewed as analogous to conventional time-based servo marks, but are positioned within a frame with the set of amplitude-based track servo windows. Also, in some embodiments, the cross-band servo marks are different from conventional time-based servo marks, insofar as they are erased marks on a servo band recorded with a periodic or DC carrier signal. The cross-band servo marks can provide coarse positioning information used for track identification, and the sets of track servo windows can provide fine positioning information used for centerline alignment.

Figure 4:
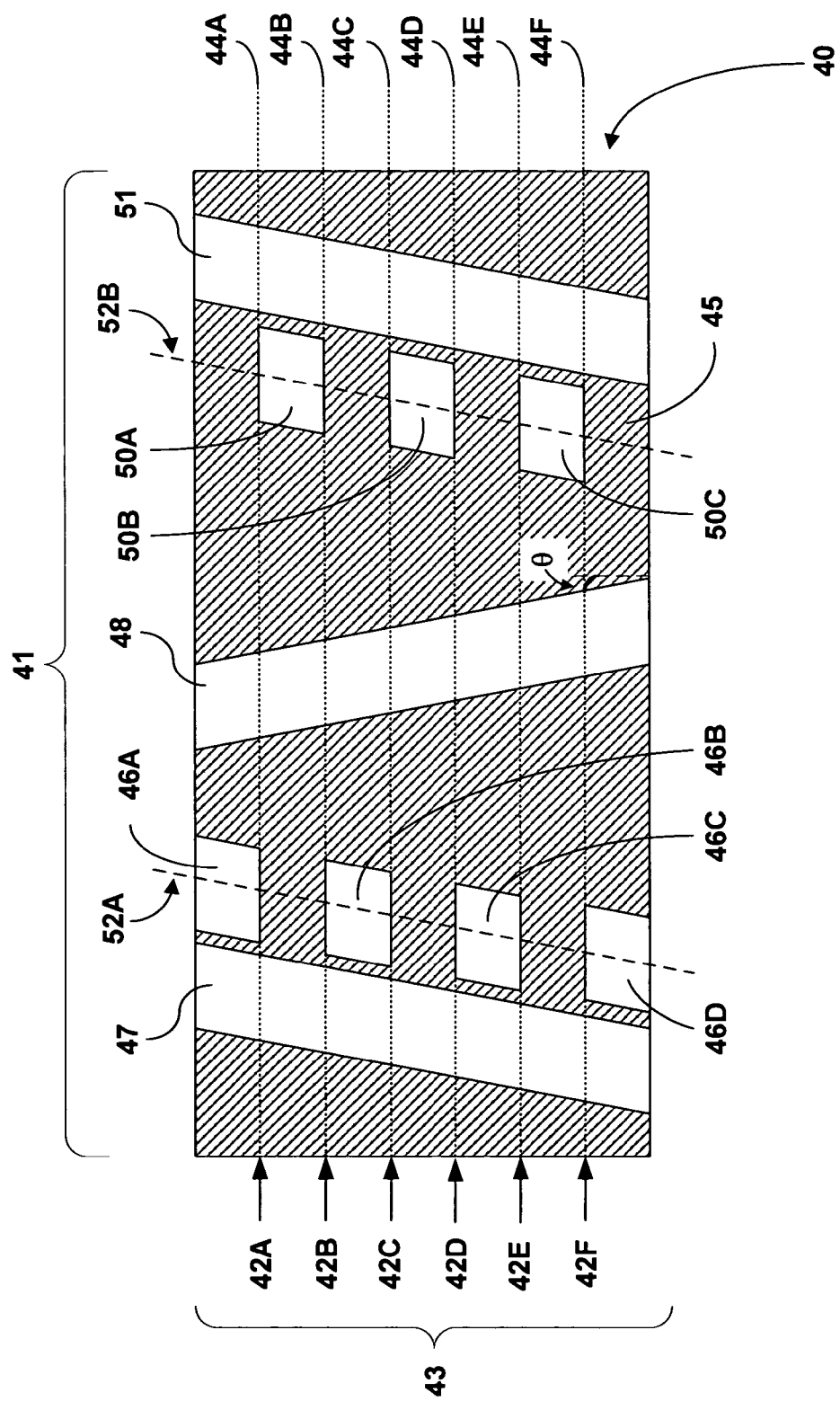
FIG. 4 is a depiction of a servo band portion of a magnetic tape including a servo frame according to an embodiment of the invention.

FIG. 4 is a depiction of a servo band portion of a magnetic tape 40 including a servo frame 41 according to an embodiment of the invention. Servo frame 41 includes six servo tracks 42A–42F that define centerlines 44A–44F. These six servo tracks 42 collectively define a servo band 43. In other embodiments, however, any number of servo tracks may be included in servo band 43. Each of servo tracks 42 may reside a known distance from a corresponding data track (not shown). In some cases, a number of data tracks are defined with respect to each of servo tracks 42.

A servo carrier signal 45 is recorded in servo band 43. Servo carrier signal 45 may magnetize magnetic particles of magnetic tape 40 in a specific direction, or with a specific periodic frequency. A servo pattern is created in servo band 43 by erasing areas of servo carrier signal 45 to form servo windows and servo marks. Servo frame 41 includes a first set of track servo windows 46A–46D positioned in servo band 43 to define centerlines 44A–44F. Track servo windows 46A–46D generally define widths that are significantly less than the width of band 43. Servo frame 41 also includes a first cross-band servo mark 47 and a second cross-band servo mark 48. In the illustrated embodiment, cross-band servo marks 47 and 48 are positioned respectively before and after first set of track servo windows 46 to provide symmetry, although the invention is not necessarily limited in that respect. First cross-band servo mark 47 is non-parallel to centerlines 44. Second cross-band servo mark 48 is non-parallel to both centerlines 44 and first cross-band servo mark 47. In some embodiments, first set of track servo windows 46, first cross-band servo mark 47, and second cross-band servo mark 48 define servo frame 41. The track servo windows and cross-band servo marks may be defined with widths relative to each other, and not necessarily relative to the width of the servo band.

In the illustrated embodiment, servo frame 41 further includes a second set of track servo windows 50A–50C also positioned to define centerlines 44A–44F. In this symmetric example, second set of track servo windows 50 is positioned after second cross-band servo mark 48. Servo frame 41 also includes a third cross-band servo mark 51 positioned after second set of track servo windows 50 and being non-parallel to centerlines 44 and parallel to first cross-band servo mark 47. Cross-band servo marks 47, 48, and 51 are tilted at angles of +/−θ with respect to a transverse or cross-tape direction, although different angles could also be used for the different marks. In some embodiments, first, second, and third cross-band servo marks 47, 48, and 51 may not cross all of centerlines 44. In other words, the term "cross-band" does not necessarily imply that the cross-band servo marks 47, 48, 51 are as wide as servo band 43. Instead, the term "cross-band" is used herein as a relative term to "track" servo windows 46A–46D and, 50A–50D. Track servo marks generally do not cross any track, unless additional track servo marks are introduced for a quadrature detection pattern. Cross-band servo marks cross at least two tracks, and typically cross every track in the band.

Second set of track servo windows 50 may provide a reduction in static errors in locating centerlines 44. Third cross-band servo mark 51 being parallel to first cross-band servo mark 47 may allow compensation for media defects and velocity error during the frame writing processes due to a constant, known distance between the first and third cross-band servo marks. Furthermore, second set of track servo windows 50 and third cross-band servo mark 51 provide the servo pattern with directional symmetry that enables writing and reading in both forward and reverse directions. However, other arrangements of the servo frame, e.g., non-symmetric arrangements could also be used. Also, additional track servo windows, or additional sets of track servo windows, may be defined with respect to each track, e.g., with the additional track servo windows being positioned directly over centerlines 44. Such additional track servo windows or additional sets of track servo windows can define a quadrature detection pattern, which can result in improved dynamic range.

The servo pattern can be written on magnetic tape 40 by passing the tape under gaps of a servo write head. A first gap in the servo write head can be used to record a magnetic signal 45 on the surface of magnetic tape 40. A servo write head (or a separate erase head) may have write gaps comprising several track widths in a direction transverse to the direction of motion of the magnetic tape. Write gaps with relatively small write gap track widths can be used to create erased track servo windows 46A–46D and 50A–50C. In contrast, write gaps with relatively large write gap track widths can be used to create cross-band servo marks 47, 48, and 51. Again, however, the terms cross-band servo mark and track servo windows are relative terms and do not necessarily imply the absolute widths of the windows and marks, nor the widths relative to the servo band.

For example, the cross-band servo marks may define cross-tape widths 2 to 30 times the cross-tape widths of the track servo windows. For example, the cross-tape widths of the cross-band servo marks may be on the order of approximately 100 microns and the cross-tape widths of the track servo windows may be on the order of approximately 10 microns. The down-tape widths of the track servo windows and the cross-band servo marks may be large enough to encompass at least one-cycle of a recorded periodic servo carrier signal. In one example, the marks and windows have erased widths that encompass approximately 18 cycles of the recorded periodic servo carrier signal in the servo band of the medium.

In operation, as magnetic tape 40 passes by a read head (not shown) positioned over a first track 42A, the positions of erased track servo windows 46A and 50A accurately define the location of the servo head relative to centerline 44A. Similarly, servo head locations on tracks 42B–42F can be defined by the various erased track servo windows 46 and 50. The strength of the detected signals associated with track servo windows 46A and 50A can be used to generate a first position error signal (PES). In some embodiments, the first PES may be generated based only on the detected signal associated with track servo window 46A. The first PES includes high resolution read head positioning information over a small range, approximately limited to a width of track servo window 46A. Due to the limited range provided by the first PES, a servo controller cannot distinguish track 42A from tracks 42B–42F.

Distances between first cross-band servo mark 47, second cross-band servo mark and third cross-band servo mark 51 accurately define the location of the servo head relative to a center of servo band 43. As can be seen, second cross-band servo mark 48 is non-parallel to both first cross-band servo mark 47 and third cross-band servo mark 51. Therefore, the distances between the adjacent cross-band servo marks are different at every point along the transverse (cross-tape) direction. For example, the distance between detection of first cross-band servo mark 47 and second cross-band servo mark 48 becomes larger when the servo head is positioned towards the bottom of servo band 43 and smaller when the servo head is positioned towards the top of servo band 43. Predetermined cross-band servo mark separation distances corresponding to each of servo tracks 42 allows the servo controller to distinguish track 42A from tracks 42B–42F.

As magnetic tape 40 passes by the read head positioned over first track 42A, the detected distances between first cross-band servo mark 47 and second cross-band servo mark 48 and between second cross-band servo mark 48 and third cross-band servo mark 51 generate a second PES. In some embodiments, the second PES is generated based only on the detected distance between first cross-band servo mark 47 and second cross-band servo mark 48. The second PES includes low resolution over a wide range, approximately equal to a width of data band 43. The wide range provided by the second PES allows the servo controller to position the servo head at a specific track and the high resolution provided by the first PES allows the servo controller to accurately position the servo head at the centerline of the specific track.

In some embodiments, servo frame 41 may further include additional sets of track servo windows positioned to overlap centerlines 44. If the servo head passes directly over track servo window 46B, for example, the servo controller cannot determine which centerline 44B or 44C to move the servo head toward. The additional sets of track servo windows provide additional quadrature positioning information to the servo controller that enables the servo controller to position the servo head over the correct centerline.

As shown in FIG. 4, first set of track servo windows 46 defines a line 52A substantially parallel to first cross-band servo mark 47. Second set of track servo windows 50 defines a line 52B substantially parallel to both third cross-band servo mark 51 and line 52A. Furthermore, the individual track servo windows 46A–46D and 50A–50C comprise slanted edges substantially parallel to lines 52A and 52B respectively. The slanted track servo window edges reduce a sudden transition from carrier signal 45 to the erased windows and provide a constant distance between first set of track servo windows 46 and first cross-band servo mark 47 and second set of track servo windows 50 and third cross-band servo mark 51. In other embodiments, the first and second sets of track servo windows may not define lines substantially parallel to the first and third cross-band servo marks respectively or to each other. Furthermore, the individual track servo windows of first and second sets of track servo windows may not necessarily comprise slanted edges.

Figure 5:
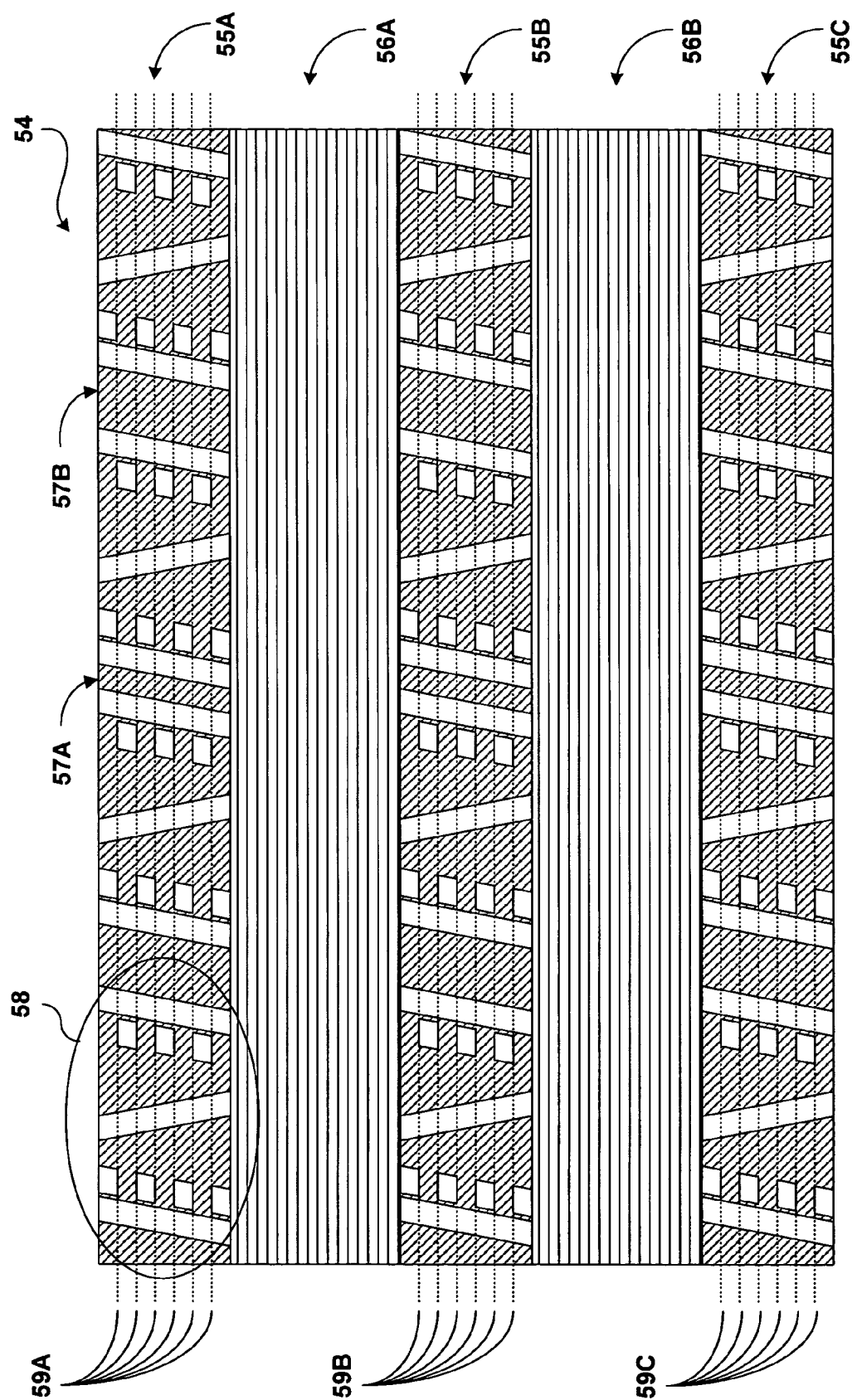
FIG. 5 is a depiction of a magnetic tape recorded with a servo pattern according to an embodiment of the invention.

FIG. 5 is a depiction of a magnetic tape 54 recorded with a servo pattern 58 according to an embodiment of the invention. Magnetic tape 54 includes servo bands 55A–55C and data bands 56A, 56B. Data bands 56A, 56B are respectively positioned between the different servo bands 55. Each of servo bands 55 defines a plurality of servo tracks. In particular, centerlines 59A, 59B, and 59C correspond to the servo tracks of respective servo bands 55. Servo bands 55 includes servo pattern 58, similar to that described in greater detail in FIG. 4. The first and second sets of track servo windows in servo pattern 58 are arranged with respect to centerlines 59, e.g., with individual windows typically being adjacent one or more centerlines 59. The first, second, and third cross-band servo marks in servo pattern 58 are positioned to cross centerlines 59 and define unique separation distances at each centerline 59. The servo pattern may be symmetric although the invention is not necessarily limited in that respect.

As illustrated, the servo pattern 58 repeats to define successive servo frames along the length of magnetic tape 54. Servo bands 55 define distances between each of the successive servo frames. The distances may also be modulated to encode a digital word, e.g., linear positioning (LPOS) information. For example, defining a short distance 57A between two adjacent frames may encode a logical "0". Defining a long distance 57B may encode a logical "1". The encoded bits along the length of magnetic tape 54 may combine to form the digital word. In some embodiments, a secondary tone can be provided between successive servo frames to encode bits of the digital word. For example, one frequency may be detected as a logical "1" and an alternate frequency may be detected as a logical "0". In that case, distances 57A and 57B may be the same size. In any case, LPOS can be provided and encoded by modulating the content or length of areas between successive servo frames described herein.

Figure 6A:
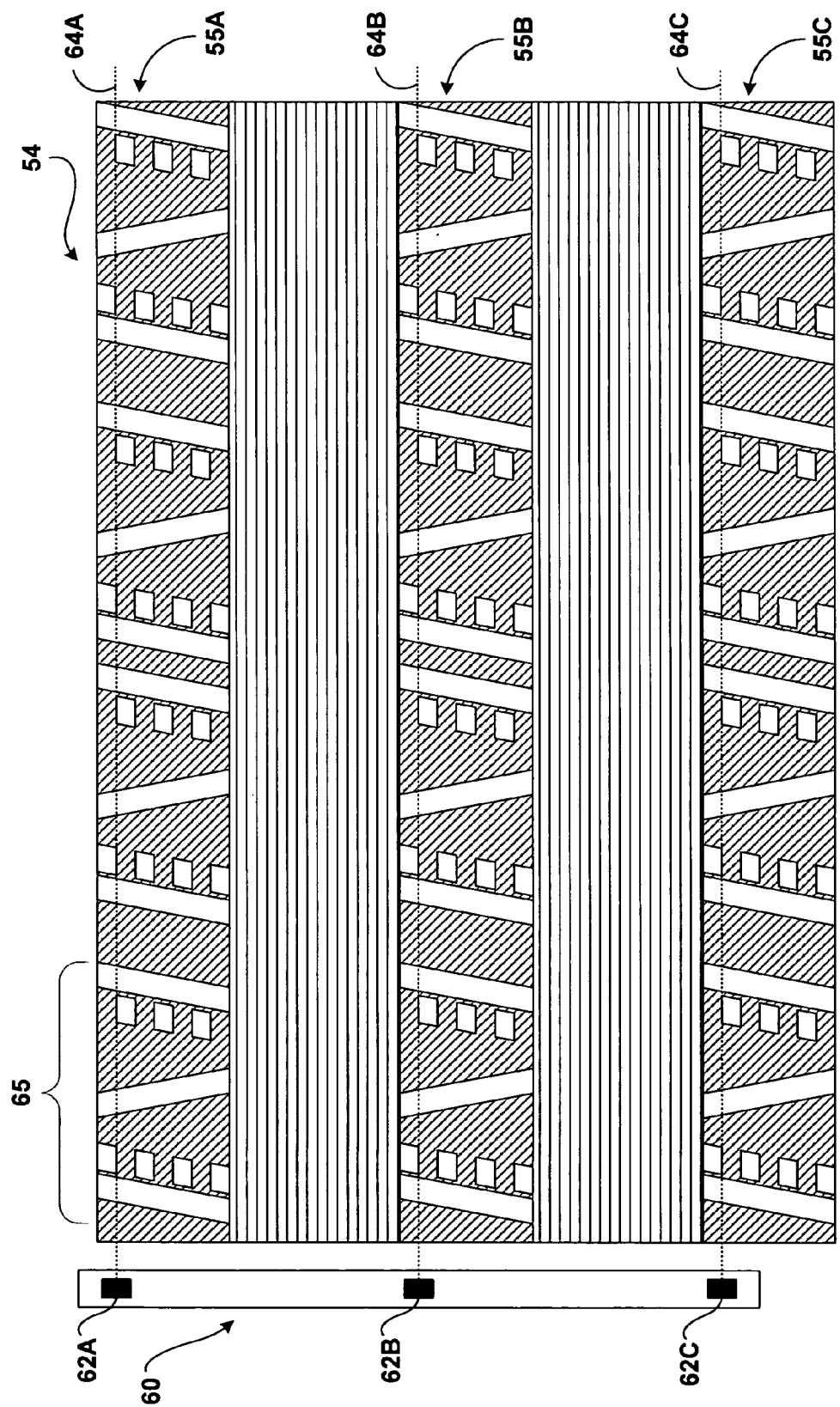
FIGS. 6A–6C are depictions of the magnetic tape of FIG. 5 with servo heads passing over the magnetic tape at various locations.
Figure 6B:
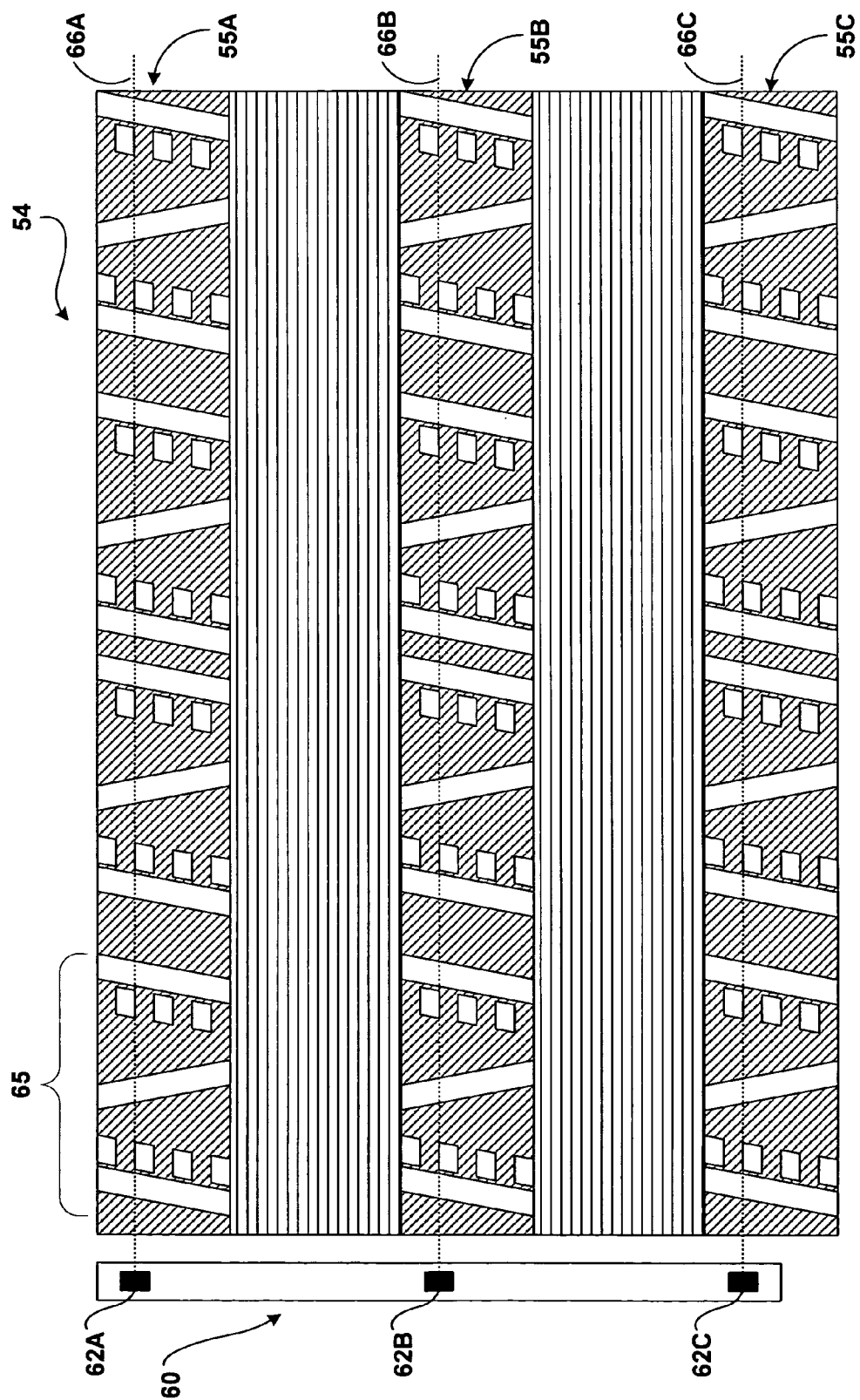
Figure 6C:
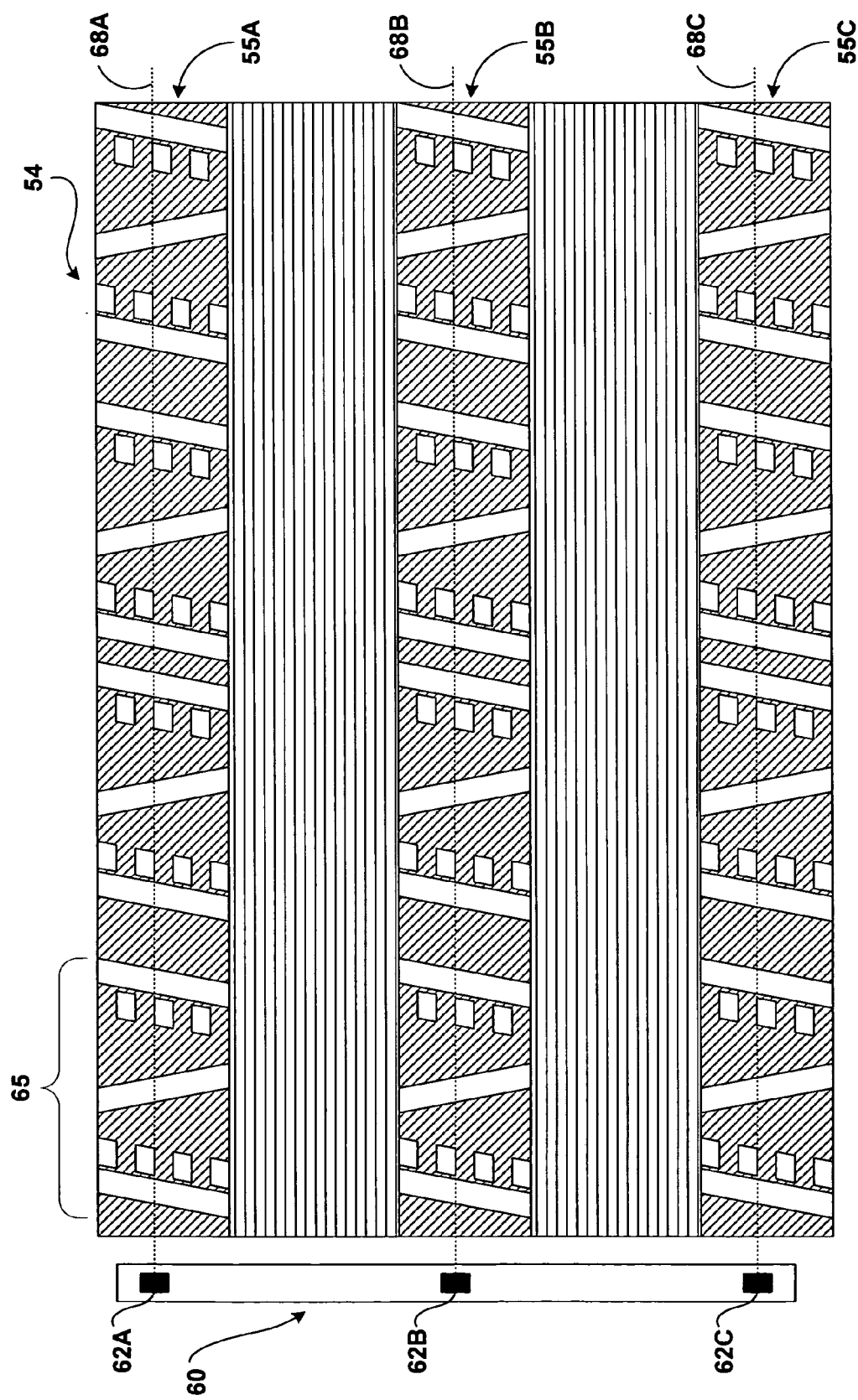

FIGS. 6A–6C is a depiction of a servo device 60 passing relative to magnetic tape 54. In the example of FIGS. 6A–6C, servo device 60 includes three servo heads 62A, 62B, 62C positioned in servo device 60 to simultaneously track respective servo tracks of servo bands 55A, 55B and 55C. For example, servo heads 62A, 62B, 62C may comprise magnetic transducer heads that detect magnetic signals on the surface of magnetic tape 54. FIG. 6A illustrates servo heads 62A, 62B, 62C passing along centerlines 64A, 64B and 64C, which correspond to first servo tracks of servo bands 55. FIG. 6B illustrates servo heads 62A, 62B, 62C passing along centerlines 66A, 66B and 66C, which correspond to second servo tracks of servo bands 55. FIG. 6C illustrates servo heads 62A, 62B, 62C passing along centerlines 68A, 68B and 68C, which correspond to third servo tracks of servo bands 55.

Figure 7A:
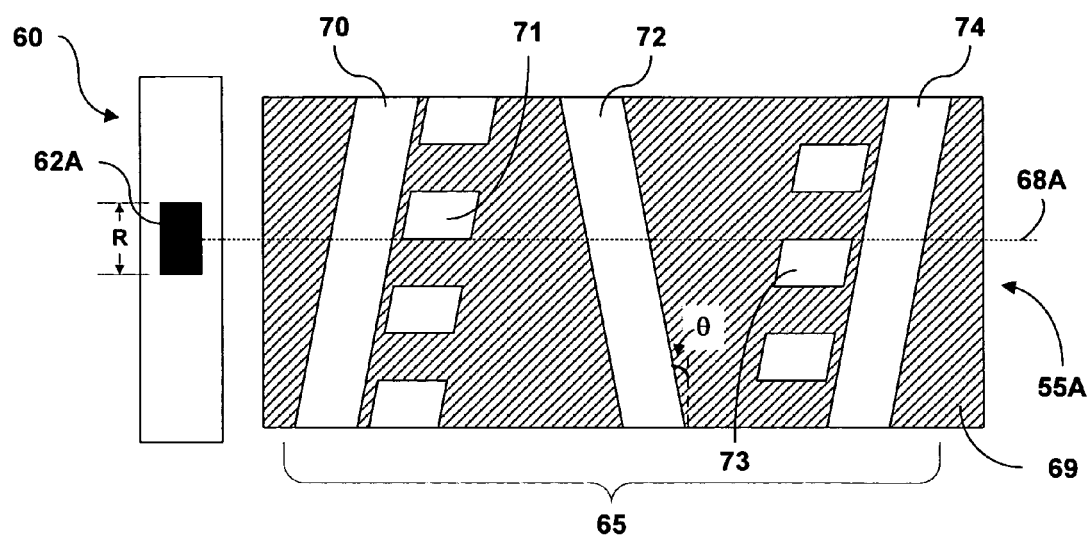
FIG. 7A is a more detailed depiction of a servo head passing over the magnetic tape as shown in FIGS. 6A–6C.

FIG. 7A is a more detailed depiction of servo device 60 passing relative to magnetic tape 54. In particular, FIG. 7A illustrates servo band 55A as first servo head 62A passes over region 65 of magnetic tape 54 along centerline 68A. First servo head 62A comprises a width (R). Region 65 comprises a servo pattern substantially similar to that illustrated in FIG. 4. Region 65 includes a servo carrier signal 69 and amplitude-based track servo windows 71 and 73 erased from signal 69 to define centerline 68A. Servo window 71 belongs to a first set of track servo windows and servo window 73 belongs to a second set of track servo windows. Region 65 also includes a first cross-band servo mark 70, a second cross-band servo mark 72, and a third cross-band servo mark 74. As can be seen, second cross-band servo mark 72 is non-parallel to both first cross-band servo mark 70 and third cross-band servo mark 74. First, second, and third cross-band servo marks 70, 72, and 74 are tilted at angles +/−θ with respect to a transverse or cross-tape direction, although different angles may also be used for the non-parallel cross-band servo marks. The angles of the cross-band servo marks may be within a range of plus or minus 4 to 50 degrees. If the angles are too broad or too shallow, resolution can be impacted. Angles of approximately plus and minus 14 degrees are effective.

Figure 7B:
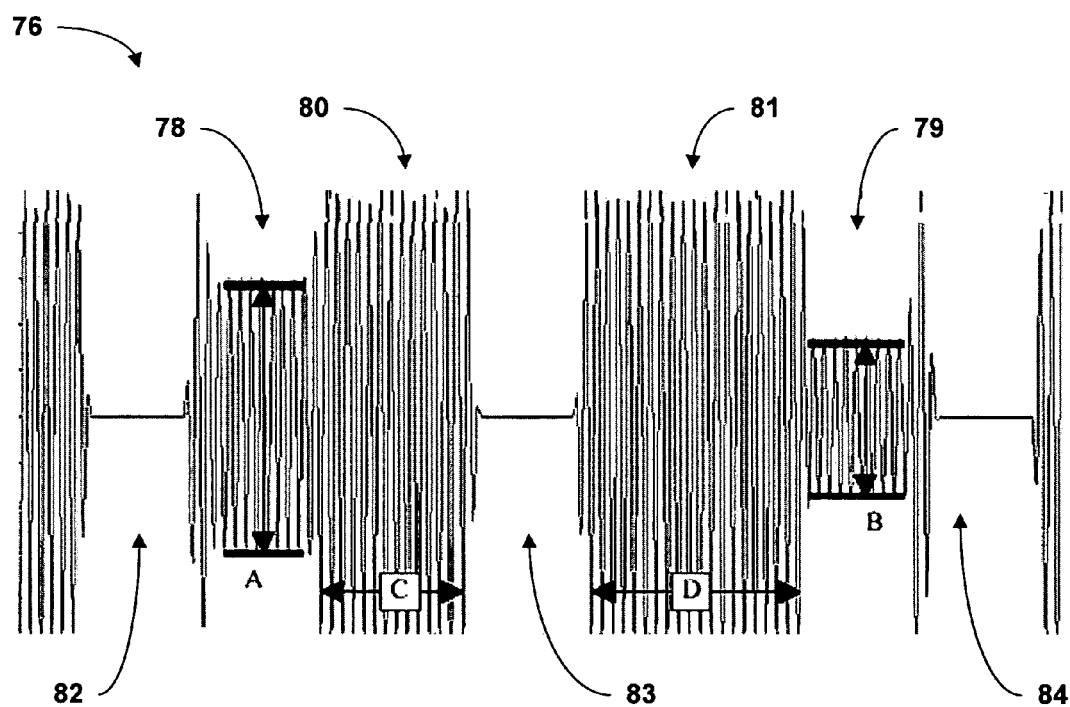
FIG. 7B illustrates an exemplary output signal associated with the servo head passing over the magnetic tape as shown in FIG. 7A.

FIG. 7B illustrates an exemplary output signal corresponding to FIG. 7A. In particular, FIG. 7B illustrates output signal 76 associated with first servo head 62A passing over region 65 of servo band 55A along centerline 68A. In general, variations in the amplitude of signal 76 can be used to identify whether servo heads 62 are on-track.

As servo head 62A passes along centerline 68A, servo carrier signal 69 provides a full amplitude response in signal 76 at locations 80 and 81. The amplitude of signal 76 falls by 100 percent at locations 82, 83, and 84 corresponding to first, second, and third cross-band servo marks 70, 72, and 74. The amplitude of servo signal 76 reduces to an amplitude (A) at location 78 corresponding to servo head 62A passing partially over track servo window 71. The amplitude of servo signal 76 reduces to an amplitude (B) at location 79 corresponding to servo head 62A passing partially over track servo window 73.

Amplitudes A and B indicate the position of servo head 62A relative to centerline 68A. For example, a fall in the amplitude of signal 76 by approximately 50 percent at both locations 78 and 79 would indicate on-track positioning of servo head 62A. However, as can be seen, amplitude A is larger than amplitude B, therefore servo head 62A may be positioned slightly below centerline 68A. A high resolution PES (PES1) may be demodulated from signal 76 by measuring amplitudes A and B.

$$PES1 = \left(\frac{R}{2}\right)\left(\frac{A-B}{A+B}\right) \qquad (1)$$

PES1 provides positioning information relative to centerline 68A that may cause movement of heads 62 to positions that ensure amplitudes A and B correspond to 50 percent falls in the amplitude of signal 76, which indicates on-track positioning.

The full amplitude response of signal 76 at locations 80 and 81 comprise distances C and D, respectively. Distances C and D correspond to distances between first and second cross-band servo marks 70 and 72 and second and third cross-band servo marks 72 and 74. As described in greater detail above, each servo track in servo band 55A comprises predetermined distances between the first and second cross-band servo marks 70 and 72 and the second and third cross-band servo marks 72 and 74. Therefore, distances C and D indicate servo track identification. A wide range PES (PES2) may be demodulated from signal 76 by measuring distances C and D.

$$PES2 = \left(\frac{D-C}{4\tan(\theta)}\right) \quad (2)$$

PES2 provides positioning information relative to a center of servo band 55A that may cause movement of heads 62 to positions that ensure distances C and D correspond to the predetermined distances attributed to a specific servo track with centerline 68A.

Distances D and C and angle $\theta$ are constant and known from the geometry of the servo pattern. Equation (2) may be rewritten as:

$$PES2 = K\left(\frac{d-c}{c+d}\right), \text{ where } K = \left(\frac{C+D}{4\tan(\theta)}\right). \quad (3)$$

K is a constant defined by the geometry of the servo pattern and ultimately the geometry of a servo write head used to record the pattern on magnetic tape 54. Values of c and d represent distances C and D independent of measurement units. For example, c and d can comprise a count of the number of peaks of signal 76 within locations 80 and 81. The sum of c and d is typically a fixed value. If a servo frame has a defect causing the sum to fall outside an expected range, that servo frame may be rejected so that it cannot corrupt either PES 1 or PES 2. Defining equation (3) to be independent of the frequency of signal 76 removes any media defect or tape speed problem that could cause a frequency error during the servo pattern writing process.

Generating the two independent PES signals, PES1 and PES2, from the same servo pattern provides inputs desired for dual stage servo actuators common in modern magnetic tape systems. Typically, a first stage comprises a voice coil or a piezo driven actuator that drives a recording head. Since only the recording head moves, the actuators have bandwidths on the order of several hundred Hertz or more, but the actuators have a limited transverse range of 50 micrometers or less. Therefore, PES1 is suited to drive the first stage as PES1 includes a range limited by the width of track servo window 71. Typically, the second stage comprises a platform driven by a positive displacement mechanism, such as a stepper motor. The platform houses the entire first stage and has a large mass relative to the first stage. The platform also moves slowly relative to the first stage. However, the second stage has a wide range of motion on the order of several millimeters or more. Therefore, PES 2 is suited to drive the second stage. In practice, a servo head may first respond to PES2 such that the positive displacement mechanism can position the servo head close to a specific servo track. The servo head may then respond to PES1 such that the voice coil can accurately position the servo head to a centerline of the specific servo track.

However, in some cases PES2 may be sufficient, even without the need for PES1. Thus, in an added embodiment, cross-band servo marks erased from a carrier-recorded servo band may be used exclusively, without the additional sets of track servo windows described herein. Cross-band servo marks, as described herein, may be different from conventional time-based servo marks. Whereas conventional time-based servo marks are typically recorded, cross-band servo marks described herein can be erased from a servo band prerecorded with a carrier. In this sense, cross-band servo marks described herein can have performance advantages relative to conventional time-based servo marks. The read-out signal can be improved, and may be absolute and unrelated to the speed of the tape, e.g., being defined by the number of peaks of the prerecorded signal between cross-band servo marks.

Figure 8:
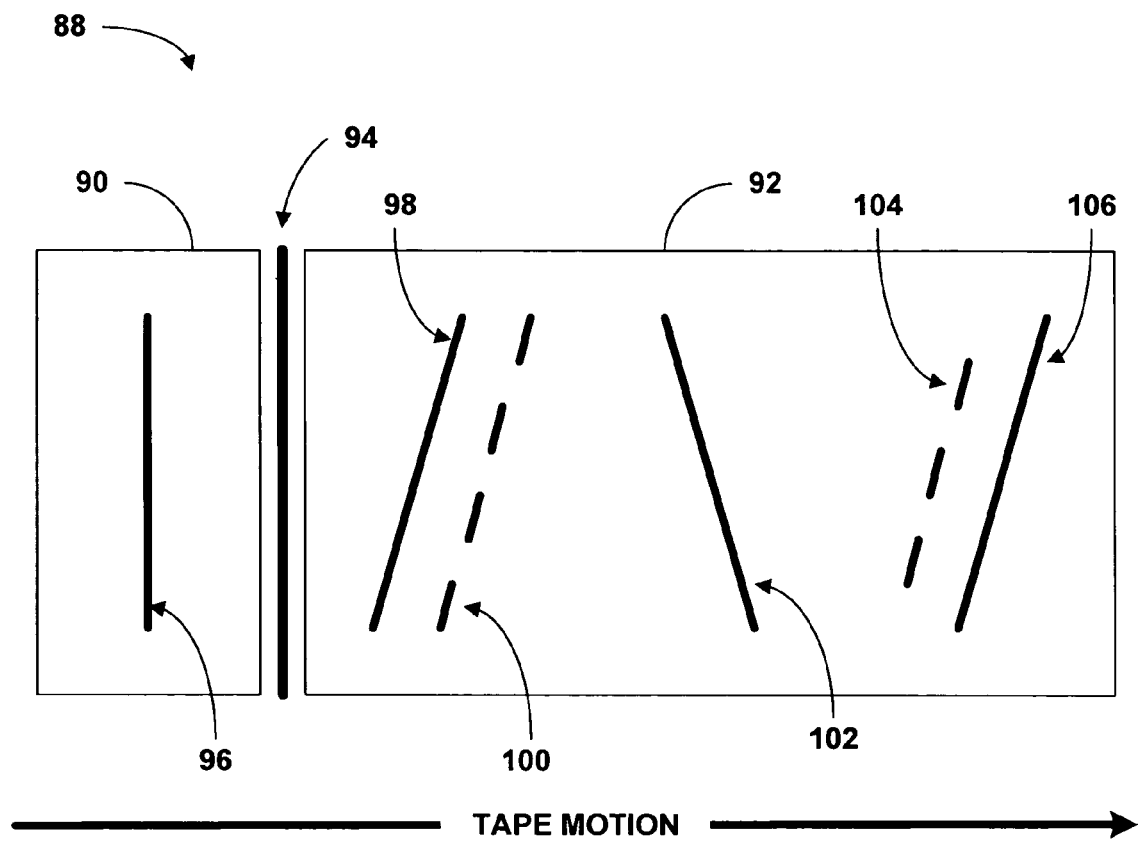
FIG. 8 is a top view of an exemplary magnetic servo head comprising a first module and a second module separated by a conductive shield.

FIG. 8 is a top view of an exemplary magnetic servo head 88 comprising a first module 90 and a second module 92 separated by a conductive shield 94. Magnetic servo head 88 illustrated in FIG. 8 may correspond to servo write head 62A illustrated in FIGS. 6A–6C and 7A. First module 90 and second module 92 are configured to record a servo pattern on a magnetic tape. In particular, modules 90 and 92 may be used to create a servo pattern similar to that of servo band 43 of FIG. 4.

First module 90 includes a relatively wide write gap 96. Second module 92 includes a first set of staggered erase gaps 100, and second set of staggered erase gaps 104, a first cross-band erase gap 98, a second cross-band erase gap 102, and a third cross-band erase gap 106. The individual erase gaps of first and second sets of staggered erase gaps 100 and 102 may be referred to as track window erase gaps. However, the terms "track window" and "cross-band" are relative terms and do not necessarily imply the absolute widths of the erase gaps, or the widths relative to a servo band of the magnetic tape.

The erase gaps 98, 100, 102, 104, and 106 may be formed in a magnetic layer over an electromagnetic element. If desired, additional wide write gaps may be formed on first module 90 and additional erase gaps may be formed on second module 92 for simultaneous creation of servo patterns on additional servo bands, similar to servo heads 62A–62C on servo device 60 of FIGS. 6A–6C. In some embodiments, second module 90 may include only first set of staggered track window erase gaps 100 and first and second cross-band erase gaps 98 and 102.

In operation, first module 90 generates a generally continuous magnetic signal at write gap 96 to record a servo carrier signal on a servo band of a magnetic tape as the magnetic tape passes relative to modules 90, 92. The continuous magnetic signal may be a DC signal or a periodic AC signal. Second module 92 generates timed bursts of magnetic signals at first and second sets of erase gaps 100 and 104 and first, second, and third erase gaps 98, 102, and 106 and as the magnetic tape passes relative to modules 90, 92. With the magnetic tape moving relative to heads 322, 323, the timed bursts of magnetic signals at erase gaps 98, 100, 102, 104, and 106 erase the recorded signal to create track servo windows and cross-band servo marks similar to those illustrated in servo band 43 of FIG. 4.

Figure 9:
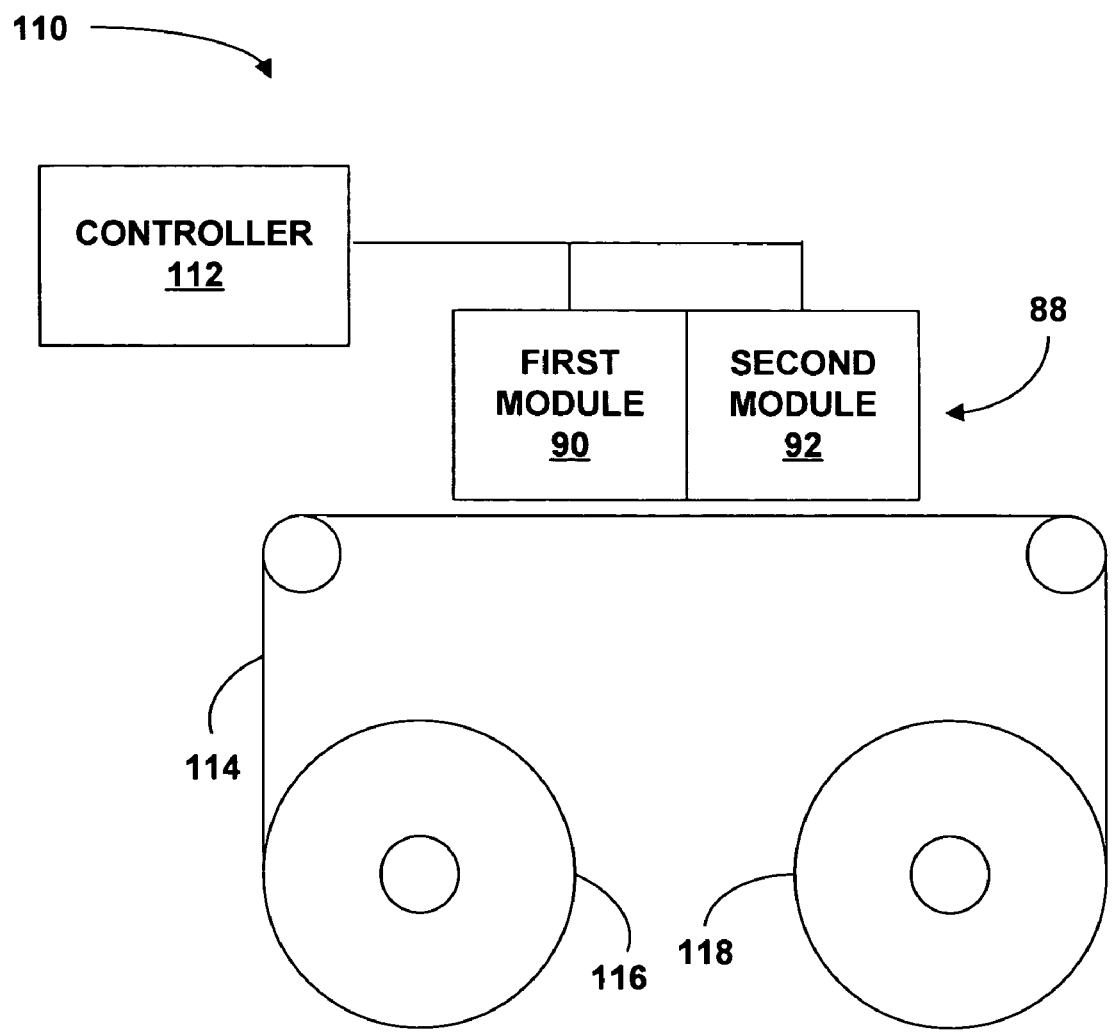
FIG. 9 illustrates an exemplary servo writing system for pre-recording servo patterns on a magnetic tape.

FIG. 9 illustrates an exemplary servo writing system 110 for pre-recording servo patterns on a magnetic tape 114 as described herein. Servo writing device 110 includes magnetic head 88, a servo controller 112, and magnetic tape 114 spooled on spools 116 and 118. As described above, magnetic head 88 includes first module 90 and a second module 92. Controller 112 controls the magnetic fields applied by modules 90, 92. Magnetic tape 114 feeds from spool 116 to spool 118, passing in close proximity to modules 90, 92. For example, magnetic tape 114 may contact modules 90, 92 during recording.

Modules 90, 92 comprise electromagnetic elements that generate magnetic fields. Controller 112 causes first module 90 to write a periodic pattern substantially over the full servo band associated with magnetic tape 114. Then, controller 112 causes second module 92 to selectively erase sets of track servo windows positioned to define centerlines of the various tracks within the servo band. Controller 112 also causes second module 92 to erase cross-band servo marks positioned to define predetermined distances between each other at intersection points with the centerlines. In accordance with the invention, the servo pattern facilitates inherent track identification without the need for conventional track identification marks. The predetermined distances between the cross-band servo marks are unique for each of the servo track centerlines. In that way, the servo pattern facilitates inherent track identification.

Figure 10:
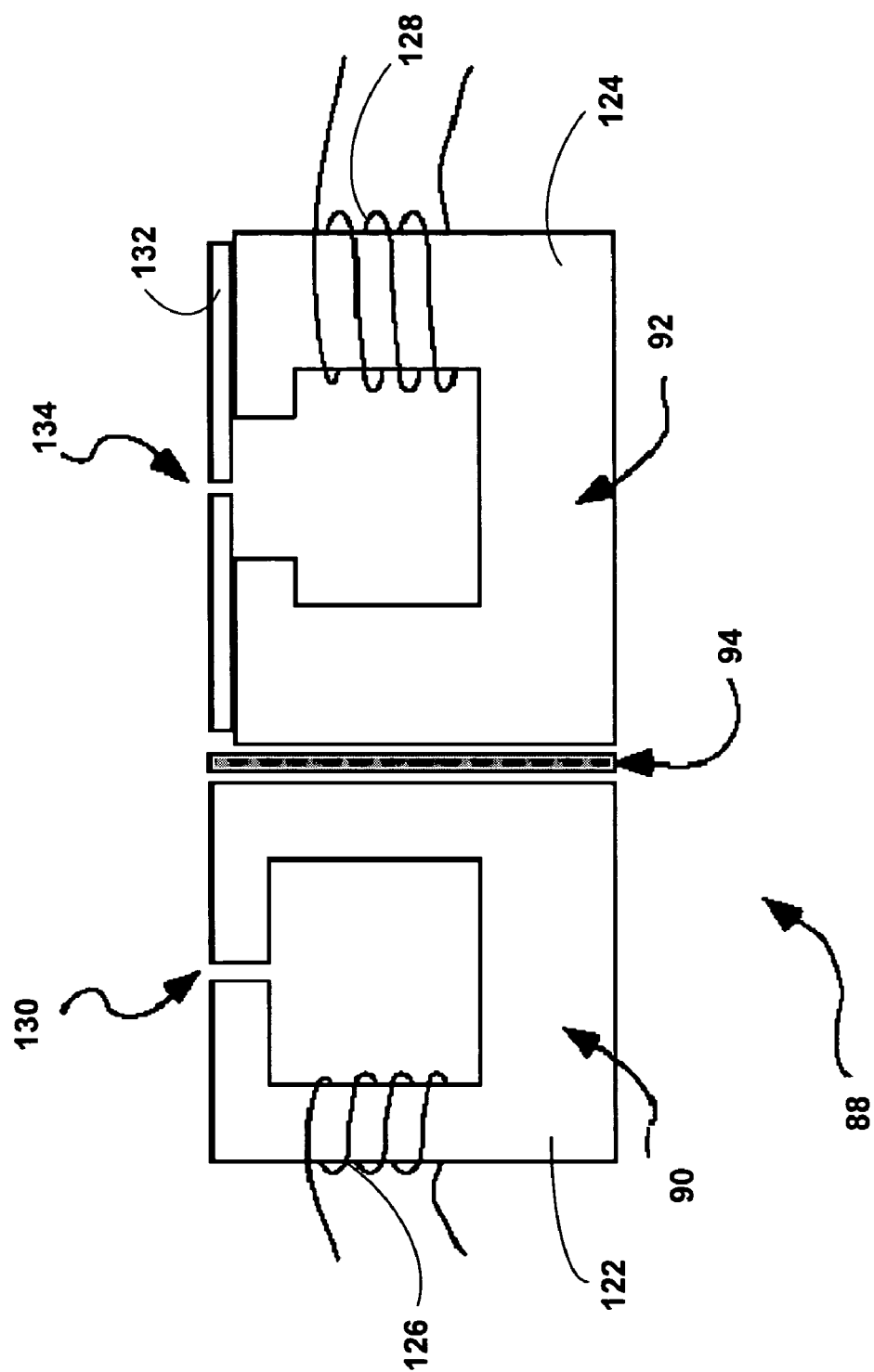
FIG. 10 is a cross-sectional conceptual view of the first module and the second module that form the magnetic servo head of FIG. 8.

FIG. 10 is a cross-sectional conceptual view of exemplary first module 90 and second module 92 that form magnetic servo head 88. Conductive shield 94 may be positioned between first module 90 and second module 92 in order to eliminate electrical or magnetic interaction between the modules. Modules 90, 92 comprise electromagnetic elements 122, 124 to generate magnetic fields. In particular, controller 112 (FIG. 9) applies electrical signals to modules 90, 92 via coils 126, 128 in order to cause modules 91, 92 to generate magnetic fields across gaps 130, 134. For example, a periodic electrical signal may be applied to module 90 via coil 126 in order to generate an oscillating magnetic field across gap(s) 130. Gap(s) 130 may be formed directly in electromagnetic element 122 to define module 90. Gap(s) 130 may be relatively wide in the transverse direction of the magnetic tape such that the magnetic signal can be recorded over a full surface of the servo band.

Controller 112 also applies an electrical signal to module 92 via coil 128 in order to generate a magnetic field across gap(s) 134. In particular, a direct current electrical signal may be applied to module 92 through coil 128, or alternatively, an alternating signal of substantially different frequency than that applied to module 90 may be applied to module 92 through coil 128. In either case, gaps 134 are arranged to define the servo pattern as described herein. In particular, module 92 may comprise a magnetic layer 132 formed over electromagnetic element 124. The magnetic layer 132 may be formed or etched to define a pattern of gaps that in turn define the servo pattern. For example, magnetic layer 132 may comprise a magnetically permeable layer that is deposited over electromagnetic element 124 via masking techniques to define patterns of gaps. Alternatively, magnetic layer 132 may comprise a magnetically permeable layer deposited over electromagnetic element 124 and then etched to define patterns of gaps. Also, magnetic layer 132 may be preformed to define the gaps and then adhered to electromagnetic element 124 to define module 92.

Various embodiments of the invention have been described. For example, a servo pattern capable of providing both high resolution and wide range positioning information to eliminate the need for conventional track identification marks has been described. Moreover, magnetic servo head configurations and recording techniques have also been described. Nevertheless, various modifications may be made without departing from the scope of the invention. For example, in some embodiments the track servo windows and cross-band servo marks could be written with signals, rather than erased, as outlined herein. In some cases, the sets of track servo windows may operate as conventional amplitude-based servo windows and the cross-band servo windows may operate substantially similar to time-based servo marks. Furthermore, the invention could be used with other media that makes use of pre-recorded servo patterns, such as magnetic disks, holographic media, or the like.

The primary arrangement of track servo windows and cross-band servo marks described herein has been a symmetric arrangement, as illustrated in FIG. 4. However, other arrangements could also be used in which a servo band includes one or more sets of track servo windows and two or more cross-band servo marks. A variety of different embodiments may comprise these elements in any order or arrangement in the servo frame.

In an added embodiment, the invention may comprise cross-band servo marks erased from a signal previously recorded on the magnetic tape in the servo band, even without the set of track servo marks described herein. Such markings would be analogous to conventional time-based servo marks, but allow for improved signal detection capabilities and improved signal-to-noise performance relative to conventional time-based marks which are typically recorded signals rather than erased marks. These and other embodiments are within the scope of the following claims.

The invention claimed is:

1. A magnetic tape comprising a servo frame, the servo frame including:
   a set of track servo windows positioned to define a set of parallel centerlines;
   a first cross-band servo mark, being non-parallel to the centerlines; and
   a second cross-band servo mark, being non-parallel to the centerlines and non-parallel to the first cross-band servo mark.

2. The magnetic tape of claim 1, wherein the servo frame is symmetric in that the first cross-band servo mark is positioned before the set of track servo windows and the second cross-band servo mark is positioned after the set of track servo windows.

3. The magnetic tape of claim 1, wherein the first and second cross-band servo marks cross one or more of the centerlines.

4. The magnetic tape of claim 1, wherein the first and second cross-band servo marks cross all of the centerlines.

5. The magnetic tape of claim 1, wherein the set of track servo windows defines a line substantially parallel to the first cross-band servo marks.

6. The magnetic tape of claim 1, further comprising a plurality of servo frames positioned along the magnetic tape, wherein each servo frame includes:
   a set of track servo windows positioned to define a set of parallel centerlines;
   a first cross-band servo mark positioned before the set of track servo windows, the first cross-band servo mark being non-parallel to the centerlines; and
   a second cross-band servo mark positioned after the set of track servo windows, the second cross-band servo mark being non-parallel to the centerlines and non-parallel to the first cross-band servo mark.

7. The magnetic tape of claim 6, wherein distances are defined between each of the plurality of servo frames and wherein the distances are selected to encode a digital word over the plurality of servo frames.

8. The magnetic tape of claim 7, wherein the digital word comprises linear positioning (LPOS) information.

9. The magnetic tape of claim 2, wherein the set of track servo windows comprises a first set of servo windows, the servo frame further including:
   a second set of track servo windows positioned after the second cross-band servo mark to define the set of parallel centerlines; and a third cross-band servo mark positioned after the second set of track servo windows, the third cross-band servo mark being non-parallel to the centerlines and parallel to the first servo window.

10. The magnetic tape of claim 9, wherein the third cross-band servo mark positioned after the second set of track servo windows crosses one or more of the centerlines.

11. The magnetic tape of claim 9, wherein the third cross-band servo mark positioned after the second set of track servo windows crosses all of the centerlines.

12. The magnetic tape of claim 9, wherein the second set of track servo windows defines a line substantially parallel to a line defined by the first set of track servo windows.

13. The magnetic tape of claim 9, wherein the second set of servo windows defines a line substantially parallel to the third cross-band servo mark.

14. The magnetic tape of claim 1, wherein the set of track servo windows encodes fine positioning information.

15. The magnetic tape of claim 14, wherein the first and second cross-band servo marks encode coarse positioning information.

16. A magnetic head positioned proximate a magnetic tape, the magnetic head comprising:
   a first module including at least one write gap to record a servo carrier signal across a servo band of the magnetic tape; and
   a second module including:
      a set of staggered erase gaps that erase areas of the servo carrier signal to create a set of track servo windows positioned to define a set of parallel centerlines in the servo band,
      a first cross-band erase gap that erases areas of the servo carrier signal to create a first cross-band servo mark, the first cross-band servo mark being non-parallel to the centerlines, and
      a second cross-band erase gap that erases areas of the servo carrier signal to create a second cross-band servo mark, the second cross-band servo mark being non-parallel to the centerlines and non-parallel to the first cross-band servo mark.

17. The magnetic head of claim 16, wherein the first cross-band servo mark is positioned before the set of track servo windows and the second cross-band servo mark is positioned after the set of track servo windows.

18. The magnetic head of claim 16, further comprising a conductive shield between the first and second modules.

19. The magnetic head of claim 17, wherein the set of staggered erase gaps in the second module comprise a first set of staggered erase gaps that create a first set of track servo windows, the second module further including:
   a second set of staggered erase gaps that erase areas of the servo carrier signal to create a second set of track servo windows positioned after the second cross-band servo mark, and a third cross-band write gap that erases areas of the servo carrier signal to create a third cross-band servo mark positioned after the second set of track servo windows, the third cross-band servo mark being non-parallel to the centerlines and parallel to the first cross-band servo mark.

20. A method comprising:
   recording a set of track servo windows positioned to define a set of parallel centerlines in a servo band of a magnetic tape;
   recording a first cross-band servo mark, the first cross-band servo mark being non-parallel to the centerlines; and
   recording a second cross-band servo mark, the second cross-band servo mark being non-parallel to the centerlines and non-parallel to the first cross-band servo mark.

21. The method of claim 20, wherein recording the servo windows comprises recording a signal in the servo band of the magnetic tape and selectively erasing the signal to define the servo windows.

22. The method of claim 20, wherein the first cross-band servo mark is recorded to be positioned before the set of track servo windows and the second cross-band servo mark is recorded to be positioned after the set of track servo windows.

23. The method of claim 22, wherein the set of servo windows comprises a first set of servo windows, the method further comprising:
   recording a second set of track servo windows positioned after the second cross-band servo mark to define the set of parallel centerlines in the servo band; and
   recording a third cross-band servo mark positioned after the second set of track servo windows, the third cross-band servo mark being non-parallel to the centerlines and parallel to the first cross-band servo mark.

24. A magnetic tape comprising:
   a servo band recorded with a periodic servo carrier signal; and
   a servo frame recorded in the servo band, the servo frame including a first cross-band servo mark erased from the servo carrier signal, and a second cross-band servo mark erased from the servo carrier signal, wherein the second servo window is non-parallel to the first servo window.

* * * * *